Dec. 15, 1931.  D. L. WOOD  1,836,699

FILM PACK

Filed Nov. 29, 1930

Inventor
Donald L. Wood,

By George A. Gillette, Jr.
Attorneys

Patented Dec. 15, 1931

1,836,699

UNITED STATES PATENT OFFICE

DONALD L. WOOD, OF ROCHESTER, NEW YORK, ASSIGNOR TO EASTMAN KODAK COMPANY, OF ROCHESTER, NEW YORK, A CORPORATION OF NEW YORK

FILM PACK

Application filed November 29, 1930. Serial No. 498,994.

This invention relates to photographic film packs and more particularly to a film pack containing a film with a small number of exposure areas successively occurring on the film and drawn through the pack by a single leader.

The primary object of the invention is to provide a film pack for a small number of exposures and of simple inexpensive construction.

Another object of the invention is to provide a film pack with a single strip of opaque material adapted to draw a continuous film strip across the exposure aperture of the film pack.

A further object of the invention is the provision of conducting means or a plurality of rollers within the film pack whereby the loading strip material is caused to take a devious path through the film pack.

Other objects of the invention will be apparent to those skilled in the photographic art as the description of the film pack is developed hereinafter.

The aforementioned objects are embodied in a film pack which comprises a casing having a plurality of rotatable rollers mounted therein over which loading strip material is drawn in a devious path by means of a single leader made of opaque strip material.

Similar elements of the film pack are designated by like reference numerals in the accompanying drawings wherein.

Figure 1:
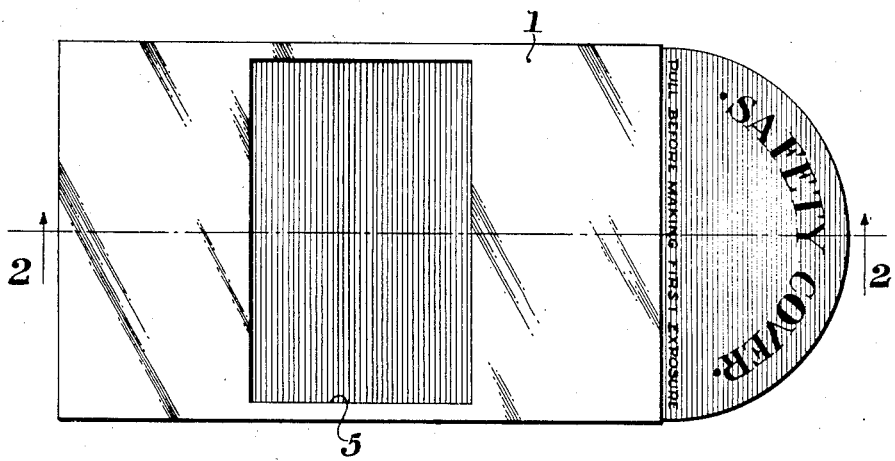
Fig. 1 is a plan view of the camera side of the assembled film pack showing the exposure aperture.

Referring to the drawings, the film pack of the invention comprises a casing having a top or camera side 1, a back 2, sides 3 and 4. The camera side 1 of the casing is provided with an exposure aperture 5, and strips 6 of light locking material, such as plush, or other suitable material are positioned on the inner side of the casing adjacent exposure aperture 5. A slot through which the opaque strip may be moved is provided in end 3 and provided with a light lock 7 also made of any suitable light locking material. The provision of light locks 6 and 7 does not constitute any part of the invention, and the materials used may be any of those which are already known to function satisfactorily.

Conducting means which comprise the plurality of rollers 8, 9, and 10 are rotatably positioned within the casing in any suitable manner. The rollers 8 and 9 form a pair and are located near the camera side 1 of the casing so that any strip material which extends over rollers 8 and 9 will be conducted past the exposure aperture 5. The roller 10 is located in the lower part of the film pack subjacent to roller 8 and is adjacent end 4 of the casing opposite the end of the casing containing the light lock 7.

A presser plate 11 is mounted in the casing opposite the exposure aperture 5 and is constructed in a known manner to resiliently abut the light lock strips 6.

The preferred form of loading strip material comprises a continuous portion of opaque strip material including a leader 12, a backing strip 21 and a closure strip 16. A continuous film strip 13 having a plurality of exposure areas is fastened at one end to leader 12 by means of a paster 14 and at the other end with some slack to closure strip 16 by means of a paster 15.

This loading strip material is placed about the rollers 8, 9 and 10 in the following manner; the closure strip 16 forms the first layer over roller 8 and the backing strip 21 and coextensive film strip 13 form the first layer over roller 9 and an outer layer over roller 8, being adjacent to closure strip 16. The leader 12 extends from the forward end of film strip 13 to comprise a second or outer layer about roller 9 and a single layer about roller 10 through the light lock 7.

Upon extraction of the leader 12, the aforementioned position of the various strips is changed so that soon only a single layer of film strip and backing paper passes about roller 8 and later the loading material which passes about roller 10 is composed of the film strip 13 and backing strip 21. After complete exposure of the film strip 13 it is contained in the film pack beyond the exposure aperture 5, around roller 9, around roller 10 and inside of light lock 7. The length of the path just described obviously limits the length of continuous film strip material which can be used.

Figure 4:
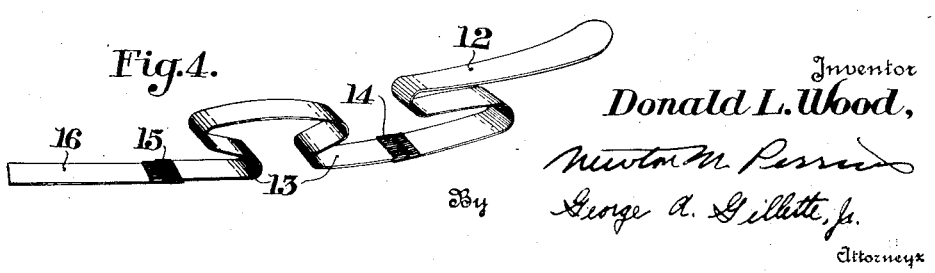
Fig. 4 is a detail perspective view of the loading strip material showing a modified form thereof.

A modified form of loading strip material is shown in Fig. 4 and comprises the leader 12, a continuous film strip attached thereto by means of a paster 14 and a closure strip 16 attached to the other end of the continuous film strip 13 by means of a paster 15, the only difference with respect to the preferred form of loading material being that backing strip 21 is omitted. The length of film strip 13 with such composition of the loading strip material is now limited by the length of a single loop around the rollers 8 and 9 to prevent the occurrence of a double layer of bare film strip in front of exposure aperture 5 with consequent double exposure. The position of the loading strip material within the back is quite similar to that described with respect to the preferred form of loading strip material in Fig. 2; i. e., the closure strip 16 and film strip 13 form a double layer over roller 8, film strip 13 and leader 12 form a double layer over roller 9 and leader 12 is in a single layer around roller 10 through light lock 7.

The above described position of the loading strip material before loading is altered, of course, by extraction of the leader 12 as described with respect to the preferred form of loading strip material and the exposed film strip 13 is supported in the film pack between one side of exposure aperture 5, around roller 9, around roller 10 and before light lock 7.

In either form of the loading strip material the leader 12 has a portion 17 with a semi-circular end containing desired directions and legends. The leader 12 is divided behind said portion 17 into a series of intervals by means of graduations 18, said intervals being equal in length to the corresponding dimension of the exposure aperture 5 and being equal in total extension to the total length of the continuous film strip 13. At each graduation 18 a proper numeral is printed to indicate the number of the exposure area which is before the exposure aperture 5, also cut outs 19 are provided at each graduation 18 so that tabs 20 are formed when the leader 12 is torn off across the light lock 7, thus providing individual tabs for the further extraction of the leader 12 after each exposure. Following the series of graduations is a strip of opaque material having the legend "Exposed" which will appear outside of the light lock when the closure strip 16 covers the exposure aperture 5. The leader 12 may now be torn off even with the light lock and the continuous film strip is contained within the film pack without danger of becoming fogged or light struck.

Figure 2:
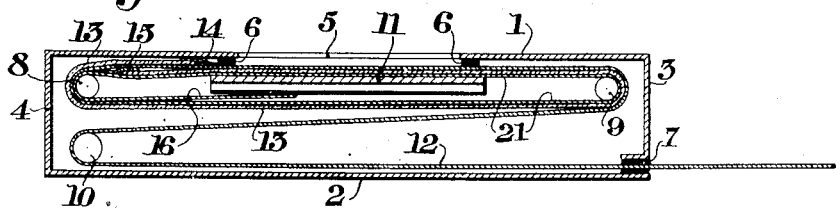
Fig. 2 is a vertical cross section of the film pack taken on a line 2—2 of Fig. 1 showing the preferred form of loading strip material.
Figure 3:
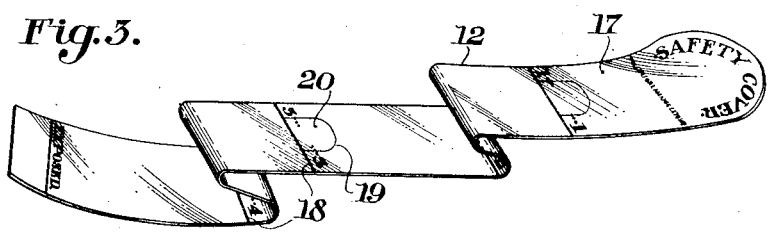
Fig. 3 is a detail perspective view of the leader which is made of opaque material and which contains various legends.

Whether the film pack is loaded with the strip material according to Fig. 2 or with the strip material according to Fig. 4, the operation of the film pack is the same as will be described hereinafter: After affixation of the film pack to the camera, the portion 17 is drawn through the light lock and torn off along the graduation 18 which is designated by arabic numeral 1 and the camera is ready for the first exposure. The first exposure area of the film strip 13 now registers with the exposure aperture 5. After the successive exposures the leader 12 is extracted farther from the film pack and torn off along the light lock 7, leaving the tab 20 protruding from the light lock after each tearing. After all the exposure areas of the film strip 13 have been exposed, the leader 12 is drawn through the light lock 7 until the legend "Exposed" appears. In this position of the loading strip material, the closure strip 16 registers with the exposure area completely covering the same so that the film pack may be removed from the camera. The presser plate 11 at all times presses the double or single layer of loading strip material against the strips 6 to provide a light tight joint between the leader 12, film strip 13 or closure strip 16.

Many modifications and variations may be made in the film pack of the invention without departing from the scope thereof, and this disclosure is to be considered as illustrative, limited only by the following claims.

Having now particularly described my invention what I claim and desire to secure by Letters Patent of the United States is:

1. A photographic film pack comprising a casing provided with an exposure aperture, conducting means in said casing, a continuous film strip for a plurality of exposures and opaque strip material, both conducted in a devious path through said film pack by said conducting means.

2. A photographic film pack comprising a casing provided with an exposure aperture, a plurality of rollers in said casing, a continuous film strip having a plurality of exposure areas and opaque strip material both conducted in a devious path over said rollers through the film pack.

3. A photographic film pack comprising a casing provided with an exposure aperture, a continuous film strip having a plurality of exposure areas, opaque strip material attached to said continuous film strip, a pair of rollers rotatably mounted in said casing conducting said continuous film strip and said opaque strip material adjacent said exposure aperture, and a single roller adjacent one of aforementioned rollers conducting said film strip and opaque strip material in a devious path through said film pack.

4. A photographic film pack comprising a casing having one side provided with an exposure aperture, a pair of rollers rotatably mounted in said casing adjacent said side, and on each side of said aperture, a single roller adjacent one of the rollers of said pair, a continuous film strip having a plurality of exposure areas and opaque strip material fastened to said film strip, a plurality of thicknesses and a single thickness of said film strip and said opaque strip material passing over said pair of rollers and said single roller, respectively, whereby said film strip and said opaque strip materials are conducted through the film pack in a devious path.

5. A photographic film pack comprising a casing having one end provided with a transverse slot and one side provided with an exposure aperture, a roller in one end of said casing adjacent said slot, two rollers positioned one above the other in the other end of the casing, a continuous film strip having a plurality of exposure areas and opaque strip material fastened to said film and extending across said exposure aperture, around the first mentioned roller, around the lower of the two rollers and through said transverse slot.

6. A photographic film pack comprising a casing having one end provided with a transverse slot and one side provided with an exposure aperture, a roller in one end of said casing adjacent said slot, two rollers positioned one above the other in the other end of the casing, a continuous film strip having a plurality of exposure areas and forming a loop above the rollers adjacent the apertured side of said casing, and opaque strip material fastened to said film strip and extending across said exposure aperture around the first mentioned roller, around the lower of the two rollers and through the transverse slot.

7. A photographic film pack comprising a casing provided with an exposure aperture, a light lock in one end of said casing, a pair of rollers each of which is rotatably mounted in said casing adjacent the ends thereof, a single roller rotatably mounted in the end of said casing opposite said light lock, and loading strip material including opaque strip material and a continuous film strip for a plurality of exposures mounted thereon, said loading strip material being in a double layer over each of the rollers of said pair, over said single roller and through said light lock.

8. A photographic film pack comprising a casing provided with an exposure aperture, a light lock in one end of said casing, a pair of rollers each of which is rotatably mounted in said casing adjacent the ends thereof, a single roller rotatably mounted in the end of said casing opposite said light lock, and loading strip material including opaque strip material and a continuous film strip for a plurality of exposures mounted thereon to form a leader and a closure strip of opaque strip material beyond each end of said film strip, said loading strip material being in a double layer over each of the rollers of said pair, in a single layer over said single roller passing through said light lock, said closure strip covering said exposure aperture after the passage of the film strip thereby.

9. In a photographic film pack, in combination, a casing provided with an exposure aperture, a light lock in one end of said casing, a pair of rollers each of which is rotatably mounted in said casing adjacent the ends thereof, a single roller rotatably mounted in the end of said casing opposite said light lock, a presser plate resiliently covering said exposure aperture and loading strip material including opaque strip material and a continuous film strip for a plurality of exposures mounted thereon, said loading strip material being in a double layer over each of the rollers of said pair and between said exposure aperture and said presser plate, and in a single layer over said single roller through said light lock.

10. In a photographic film pack, in combination, a casing provided with an exposure aperture, a light lock in one end of said casing, a pair of rollers each of which is rotatably mounted in said casing adjacent the ends thereof, a single roller rotatably mounted in the end of said casing opposite said light lock, loading strip material including opaque strip material and a continuous film strip for a plurality of exposures mounted on said opaque strip material in spaced relation to one end thereof to form a leader, and graduations at intervals thereon to register with said light lock and indicate corresponding positions of the film strip before the exposure aperture.

Signed at Rochester, N. Y., this 21st day of November, 1930.

DONALD L. WOOD.